Patented Jan. 29, 1924.

1,481,849

UNITED STATES PATENT OFFICE.

LUDVIG AUGUST MEYER, OF COPENHAGEN, DENMARK, ASSIGNOR TO THE FIRM OF INTERNATIONAL CHEMICAL COMPANY, OF COPENHAGEN, DENMARK.

METHOD FOR PRESERVING ALREADY PARTLY POLYMERIZED FORMALDEHYDE.

No Drawing.   Application filed December 31, 1921.   Serial No. 526,317.

*To all whom it may concern:*

Be it known that I, LUDVIG AUGUST MEYER, subject of the Kingdom of Denmark, residing at Tordenskjoldsgade 15, Copenhagen, Denmark, have invented certain new and useful Improvements in Methods for Preserving Already Partly Polymerized Formaldehyde, of which the following is a specification.

This invention relates to the treatment of formaldehyde, and its object is to reduce polymerization and consequent formation of paraformaldehyde.

As is generally known, formaldehyde gradually becomes polymerized when kept for a long period of time, with the result that paraformaldehyde is formed; the formaldehyde being converted from its original liquid state into a product of buttery consistency containing more and more paraformaldehyde, until it finally becomes completely transformed into the latter substance. That substance, however, is very difficultly soluble in water; and, since one of the chief uses of formaldehyde is as a disinfectant, in which instance it is utilized in the form of a watery solution, it will be apparent that the aforesaid substance is not suitable for the purpose specified.

I have found, however, that if partially-polymerized formaldehyde which, as previously stated, is in a more or less buttery condition, be treated with a 2–5% solution of an alkali which is soluble in water, the formation of paraformaldehyde will be greatly reduced and, consequently, the solubility of the product or substance in water will be augmented. The solubility of the formaldehyde may be further increased by adding to the previously mentioned alkali a suitable quantity of monohydric or trihydric alcohol which will also have the effect of rendering the paraformaldehyde already formed soluble in water.

I claim as my invention:

1. The method of preserving formaldehyde which consists in adding to it a solution of a water-soluble alkali and an alcohol which will render soluble in water any paraformaldehyde already formed and will prevent the further formation thereof; substantially as described.

2. The method of preserving formaldehyde which consists in adding to it a 2–5% solution of a water-soluble alkali and an alcohol which will render soluble in water any paraformaldehyde already formed and will prevent the further formation thereof; substantially as described.

3. The method of preserving formaldehyde, which consists in adding to it a solution which will render soluble in water any paraformaldehyde already formed and will prevent the further formation thereof; substantially as described.

In testimony whereof I affix my signature.

LUDVIG AUGUST MEYER.